(12) United States Patent
Lin et al.

(10) Patent No.: US 6,356,055 B1
(45) Date of Patent: Mar. 12, 2002

(54) CELL VOLTAGE BALANCER

(75) Inventors: Pao-Chuan Lin; Chung-Shing Tzou; Hsiao-Chih Ku; Yi-Hwa Liu; Yung-Hsiang Liu, all of Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/669,561

(22) Filed: Sep. 26, 2000

(30) Foreign Application Priority Data

Jul. 11, 2000 (TW) ......................................... 089211927

(51) Int. Cl.⁷ ................................. H02J 7/00; H02J 7/14
(52) U.S. Cl. ....................... 320/116; 320/121; 320/124
(58) Field of Search ................................. 320/116, 121, 320/124

(56) References Cited

U.S. PATENT DOCUMENTS 5,594,320 A * 1/1997 Pacholok et al. ........... 320/103
5,821,729 A * 10/1998 Schmidt et al. ............. 320/126
6,180,795 B1 * 11/2001 Kutkut et al. ............... 320/118

* cited by examiner

Primary Examiner—Gregory Toatley
(74) Attorney, Agent, or Firm—Rabin & Berdo, P.C.

(57) ABSTRACT

A cell voltage balancer for balancing the voltage of the first cell and the voltage of the second cell. The cell voltage balancer includes the first input terminal, the second input terminal and the third input terminal. The cell voltage balancer includes a transformer, the first switch and the second switch. The transformer includes a primary winding and a secondary winding. The first switch and the primary winding are serially connected between the first input terminal and the second input terminal. The second switch and the secondary winding are serially connected between the second input terminal and the third input terminal. The first switch and the second switch are switched on and off alternatively. While the first switch is on and the second switch is off, the primary winding stores energy of the first cell in the transformer. On the contrary, the secondary winding recovers energy stored in the transformer into the second cell.

31 Claims, 8 Drawing Sheets

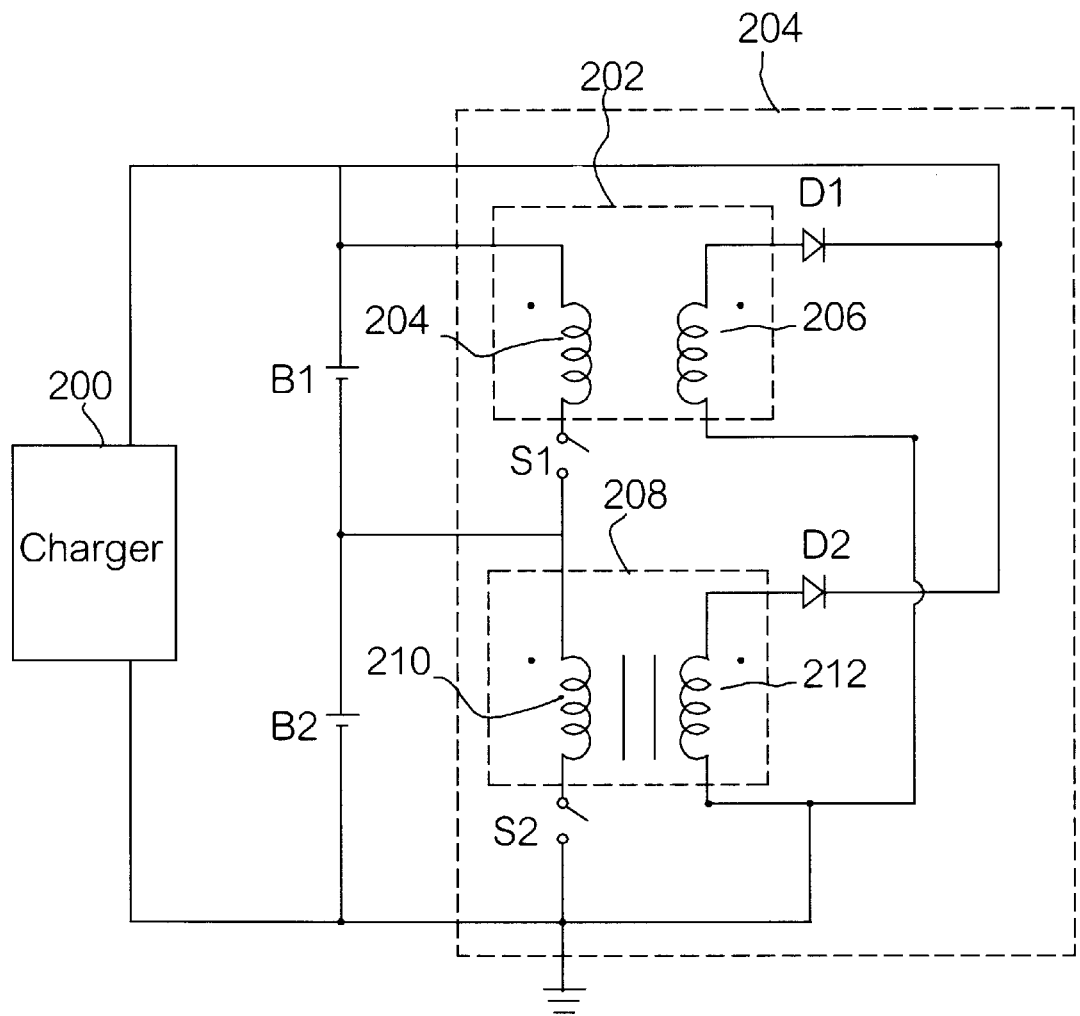
FIG. 2A (PROIR ART)

CELL VOLTAGE BALANCER

BACKGROUND OF THE INVENTION

This application incorporates by reference Taiwanese application Serial No. 89211927, Filed Jul. 11, 2000.

1. Field of the Invention

The invention relates in general to a cell voltage balancer, and more particularly to a cell voltage balancer which is capable of balancing the voltage of numerous cells which are connected in series.

2. Description of the Related Art

Unbalance charging usually occurs in cells connected in series. Cells connected in series have equal current flowing through but may not be equally charged due to various cell voltages and cell capacities of the cells. Consequently, some cells are overcharged while some are not fully charged.

The lifetime of overcharged cells could be shortened as a result of raised temperature. Irreversible chemical reaction may also occur, which reduces the performance of the cells and causes permanent damage of the cells.

Therefore, the application of a cell voltage balancer is important. FIG. 1, is a schematic diagram showing charging cells connected in series with the aid of a conventional cell voltage balancer. Four cells in charging are taken as an example. The conventional cell voltage balancer 100 includes resistances R1, R2, R3, R4, switches S1,S2,S3, and S4. Cells B1,B2,B3 and B4 are charged by charger 101. Cell B1 is connected in parallel with resistance R1 and switch S1 connected serially; cell B2 is connected in parallel with resistance R2 and switch S2 connected serially; cell B3 is connected in parallel with resistance R3 and switch S3 connected serially; and cell B4 is connected in parallel with resistance R4 and switch S4 connected serially. The voltage V1, V2, V3, and V4 of the respective cells B1, B2, B3 and B4 are inputted into the control signal generator 102 for controlling the switches S1, S2, S3 and S4.

While in charging mode, The charger 101 can, for example, provide a constant current I to charge the cells. An average voltage V of the cells B1, B2, B3 and B4 is obtained after the voltages V1, V2, V3 and V4 are received by the control signal generator 102. The voltages V1, V2 V3 and V4 of each cell are then compared with the average voltage V. If the voltage of a cell is higher than the average voltage V, the corresponding switch is set on.

For example, while the voltage V1 of the cell B1 is higher than the average voltage V, and the voltages of the cells B2, B3 and B4 are all lower than the average voltage V, the control signal generator 102 sets the switch S1 on and the switches S2, S3 and S4 off. Meanwhile, the current I will be separated in two directions. The first direction is still to charge cell B1. The second direction is through R1 and S1. The charging current of B1 is less then the others, so the voltage rise of B1 will less then others.

When the charger 101 stops charging the cells B1, B2, B3 and B4 and these cells are not balanced in voltage, the control signal generator 102 can still receive voltages, V1, V2, V3 and V4 and set the corresponding switch on or off in order to balance the voltage of the cells.

However, the conventional method and mechanism stated above has the following disadvantages:

1. the resistance R1 consumes a part of the electrical energy and therefore the efficiency of the charger is reduced and the energy dissipated in resistance R1 is wasted; and 2. the heat produced by the resistance R1 raises the surrounding temperature, which reduces the performance of the cells.

To reduce the disadvantage of energy consumption of the cell voltage balancer as shown in FIG. 1, the discharging resistance is replaced by a transformer. FIG. 2A is a circuit block diagram showing another conventional cell voltage balancer applicable to charging serially connected cells. And FIG. 2B illustrates the operation of the circuit as shown in FIG. 2A. The transformer 202 includes a primary winding 204 and a secondary winding 206 and the transformer 208 includes a primary winding 210 and a secondary winding 212. The primary windings 204, 206 are serially connected with the switches S1, S2, respectively. The secondary windings 206, 212 are serially connected with the diodes D1, D2, respectively. The transformers 202, 208, switches S1, S2, and diodes D1, D2 together form a conventional cell voltage balancer 214.

Cell B1 and the serially connected primary winding 204 and switch S1 are connected in parallel. Cell B2 and the serially connected primary winding 210 and switch S2 are connected in parallel. The secondary winding 206 and the diode D1 connect to the secondary winding 212 and the diode D2 in parallel. The turns of the secondary windings 206, 212 are at least two times of that of the primary windings 204, 210. The following example is taken for illustration, assuming that the of the secondary windings 206, 212 is two times of the primary windings 204, 210 and the voltage of cell B1 is larger than that of cell B2.

As shown in FIG. 2B, when the voltage of cell B1 is larger than the average voltage of cell B1 and cell B2, the switch S1 is turned on and cell B1 discharges. Meanwhile, current I1 flows through the primary winding 204. Because the voltage across the primary winding 204 is equal to the voltage of cell B1, the voltage across the secondary winding 206 is two times of that of the primary winding 204; that is two times of the voltage of the cell B1. Consequently, the voltage of the node N1 is larger than the sum of the voltage of cell B1 and the voltage of cell B2. So, the induced current I2 of the secondary winding 206 flows through diode D1 and cell B1 and flows toward cell B2 to charge cell B2. Consequently, the voltage of cell B1 is decreased to effectively avoid overcharge of cell B1. In addition, the energy released by cell B1 transfers to cell B2.

Similarly, when the charger 200 stops charging cell B1 and cell B2, the voltage unbalance of cells B1 and B2 may occurs and the cell voltage balancer 214 could still function to balance the voltage of the cells.

FIG. 3 shows the conventional cell voltage balancer of FIG. 2A which charges n serially connected cells. In order to recover energy to the n serially connected cells, the voltage of the secondary winding must be n times of that of the primary winding. Thus, the turns of the secondary windings $304_1$, $304_2$, ..., $304_n$ of the transformers $302_1$, $302_2$, ..., $302_n$ should be more than n times of that of the primary windings $306_1$, $306_2$, ..., $306_n$. Although the conventional cell voltage balancer is capable of recovering the energy of high voltage cells to others, the design of the cell voltage balancer therefor becomes much more complex and the size of the transformer is thus enlarged due to the various turns of the transformer while various number of cells are used.

SUMMARY OF THE INVENTION

It is therefore an object of the invention to provide a cell voltage balancer which effective recovers energy with the aid of a transformer. The transformer of the invention is provided in the form of a module so that the turns of the transformer will not be a function of the number of series connected cells. The turns of each transform is fixed so that the circuit design is simplified and the size of the transformer is reduced.

It is another object of the invention to provide a cell voltage balancer for balancing the voltage of the first cell and the voltage of the second cell. The cell voltage balancer includes the first input terminal, the second input terminal and the third input terminal. The cell voltage balancer includes a transformer, the first switch, the second switch, the first diode and the second diode. The transformer includes a primary winding and a secondary winding. The first switch and the primary winding are serially connected between the first input terminal and the second input terminal. The second switch and the secondary winding are serially connected between the second input terminal and the third input terminal. The first switch and the second switch are switched on and off alternatively. The first diode and the first switch are connected in parallel and the second diode and the second switch are connected in parallel. While the first switch is on and the second switch is off, the primary winding stores energy of the first cell in the transformer and while the first switch is off and the second switch is on, the secondary winding recovers energy stored in the transformer into the second cell.

It is therefore a further object of the invention to provide a cell voltage balancing system for balancing the voltage of a number of cells. The cell voltage balancing system includes a number of cell voltage balancers. Each of the cell voltage balancers includes the first input terminal, the second input terminal and the third input terminal. Each of the cell voltage balancers is connected to two adjacent cells, the first cell and the second cell, of the cells. The second input terminal is connected to the common node of the first cell and the second cell. Each of the cell voltage balancer includes a transformer, the first switch, the second switch, the first diode and the second diode. The transformer includes a primary winding and a secondary winding. The first switch and the primary winding are serially connected between the first input terminal and the second input terminal. The second switch and the secondary winding are serially connected between the second input terminal and the third input terminal. The first switch and the second switch are switched on and off alternatively. The first diode and the first switch are connected in parallel and the second diode and the second switch are connected in parallel. While the first switch is on and the second switch is off, the primary winding stores energy of the first cell in the transformer and while the first switch is off and the second switch is on, the secondary winding recovers energy stored in the transformer into the second cell.

BRIEF DESCRIPTION OF THE DRAWINGS

Other objects, features, and advantages of the invention will become apparent from the following detailed description of the preferred but non-limiting embodiments. The description is made with reference to the accompanying drawings in which:

FIG. 2A (Prior Art) is a circuit block diagram showing another conventional cell voltage balancer charges serially connected cells.

DESCRIPTION OF THE PREFERRED EMBODIMENT

Figure 4:
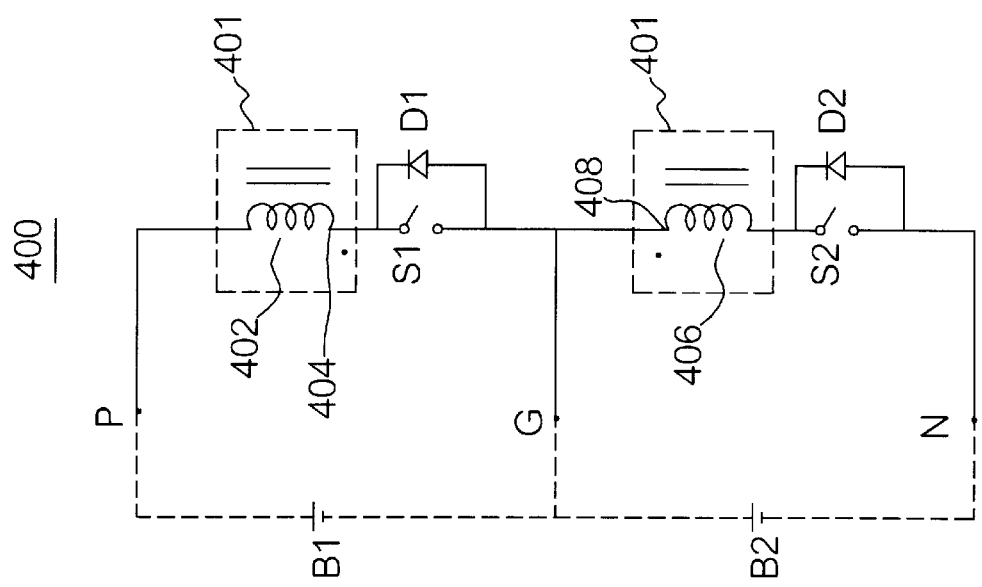
FIG. 4 shows the circuit of the cell voltage balancer according to a preferred embodiment of the invention.

The cell voltage balancer 400 as shown in FIG. 4 includes three input terminals P, G, N, a transformer 401, switches S1, S2 and diodes D1, D2. The transformer 401 includes a primary winding 402 and a secondary winding 406. Switch S1 and diode D1, which are connected in parallel, and the primary winding 402 are serially connected between the input terminal P and the input terminal G. Switch S2 and diode D2, which are connected in parallel, and the secondary winding 406 are serially connected between the input terminal G and the input terminal N.

The input terminal P is connected to the positive terminal of cell B1; the input terminal G is connected to the negative terminal of cell B1 and the positive terminal of cell B2; and the input terminal N is connected to the negative terminal of cell B2. Herein, the situation that the voltage of cell B1 is higher than the voltage of cell B2 is taken as an example to illustrate the preferred embodiment of the invention.

While cell B1 and cell B2 are charged, the cell voltage balancer 400 is capable of balancing the voltage of cell B1 and cell B2 so that the phenomenon of overcharge can be prevented. Cell B1 is between the input terminal P and the input terminal G and cell B2 is between the input terminal G and the input terminal N and they are connected in series. Switch S1 and switch S2 are two switching devices.

While the charging of cell B1 and cell B2 is ceased, the cell voltage balancer 400 is able to keep the voltage of cell B1 and cell B2 balanced. Thus, cell B1 and cell B2 can be prevented from having voltage unbalance.

Figure 1:
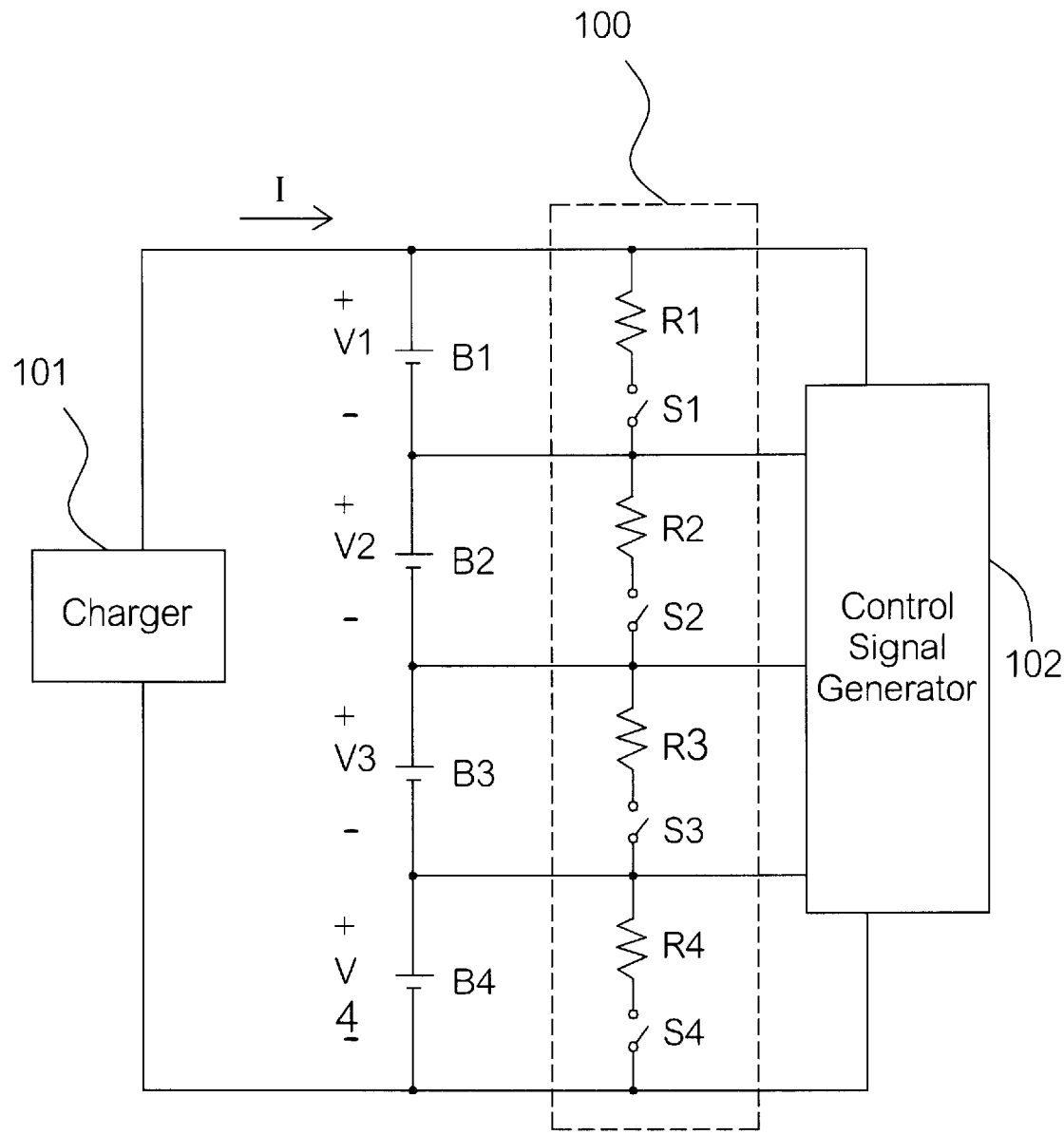
FIG. 1 (Prior Art) is a schematic diagram showing charging cells connected in series with the aid of a conventional cell voltage balancer.
Figure 2B:
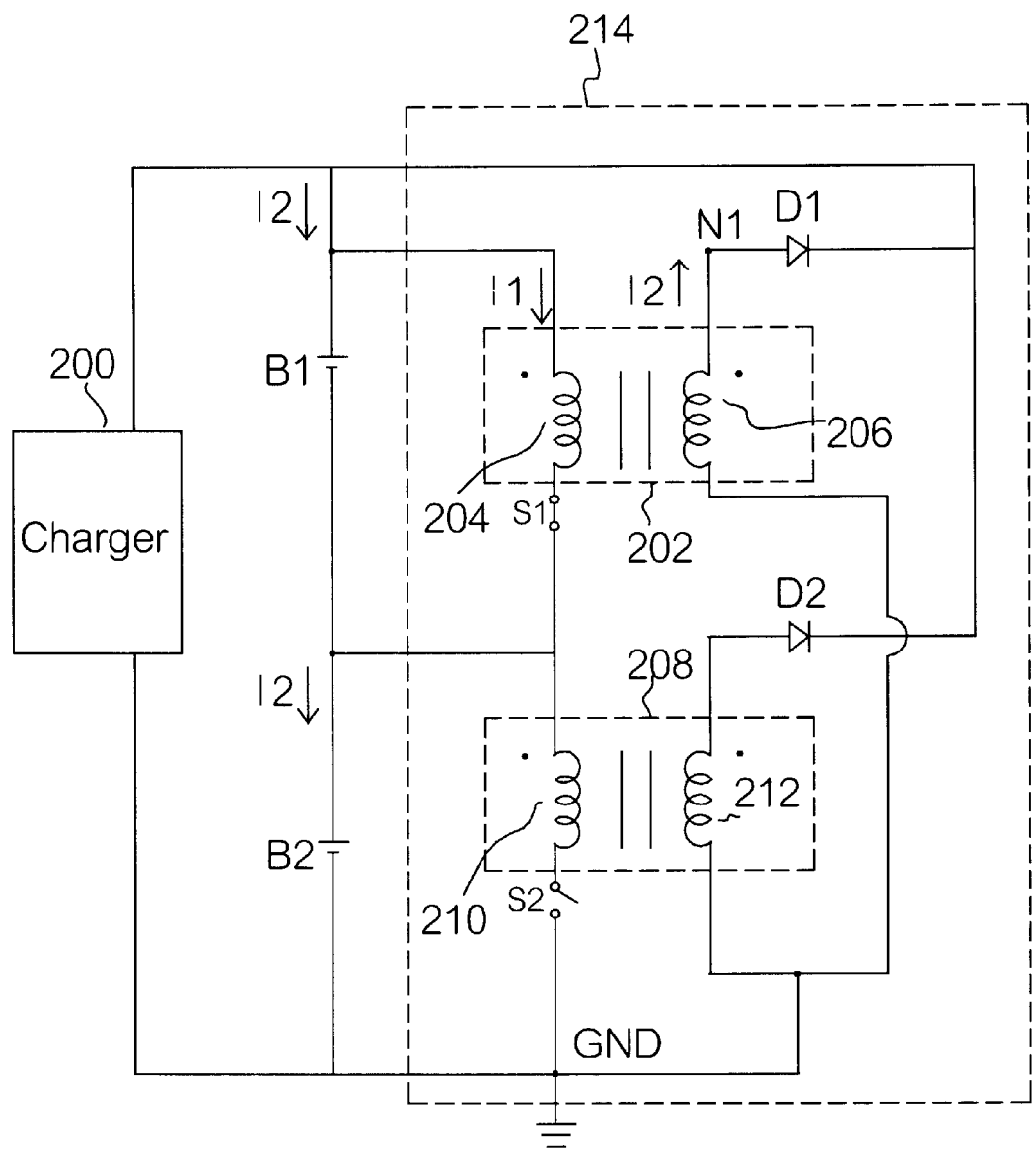
FIG. 2B (Prior Art) illustrates the operation of the circuit as shown in FIG. 2A.
Figure 3:
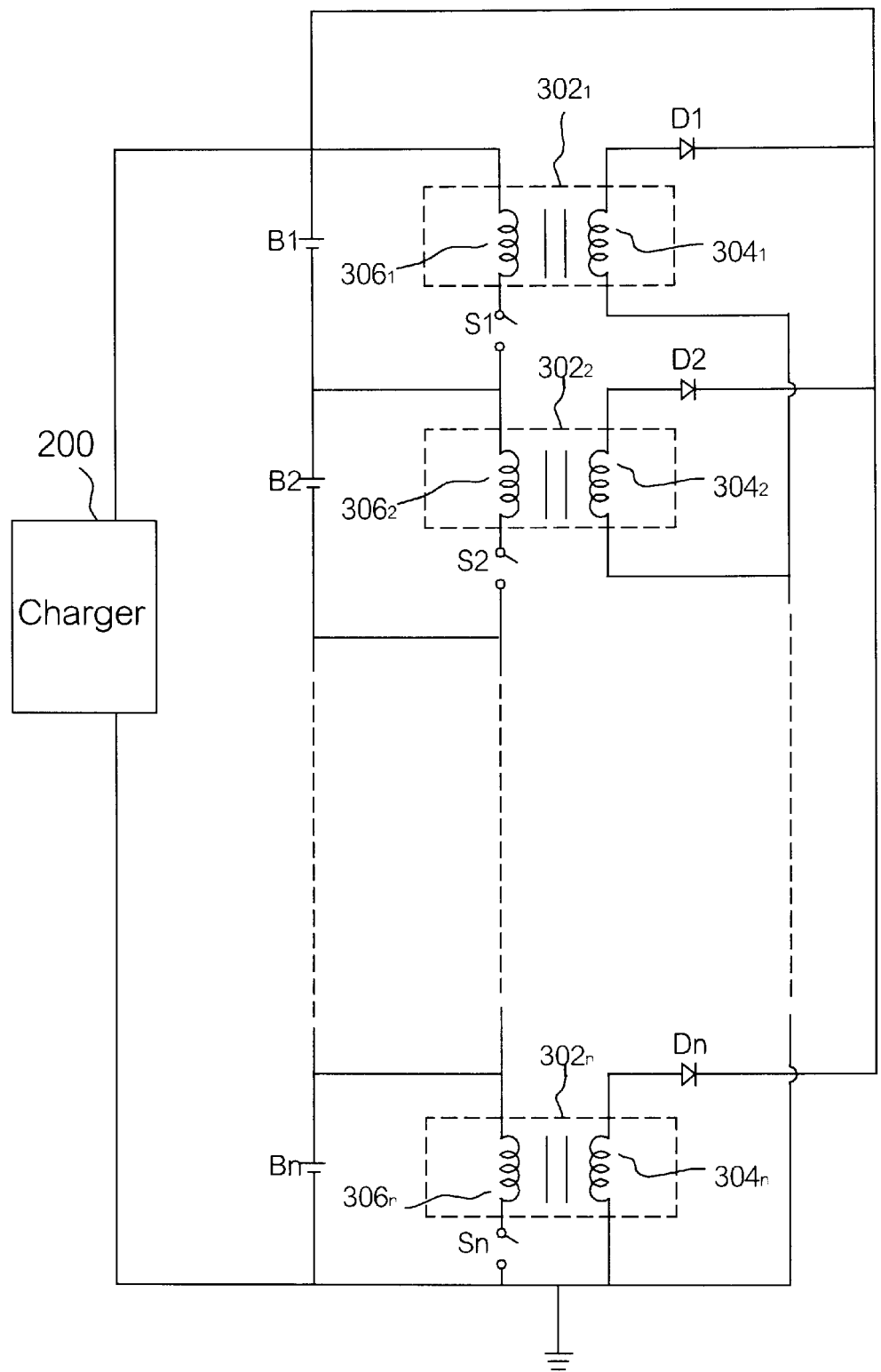
FIG. 3 (Prior Art) shows the conventional cell voltage balancer of FIG. 2A charges n serially connected cells.
Figure 5A:
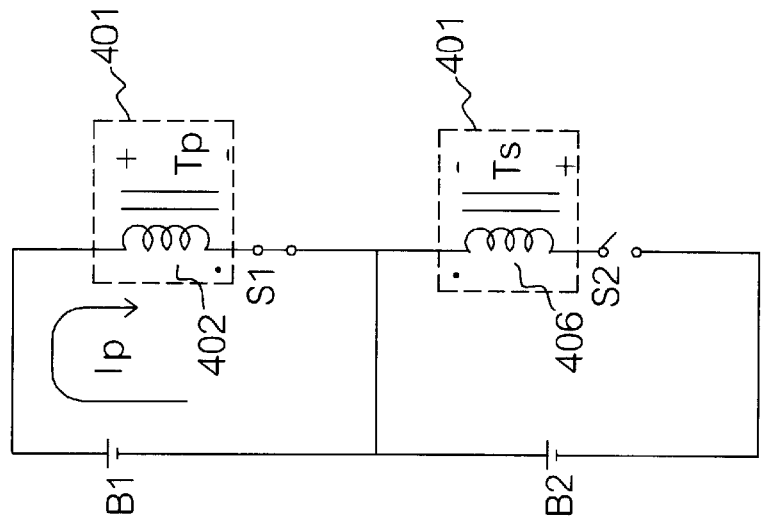
FIG. 5A–5B are the equivalent circuit diagrams of the cell voltage balancer, as shown in FIG. 4, according to a preferred embodiment of the invention.
Figure 5B:
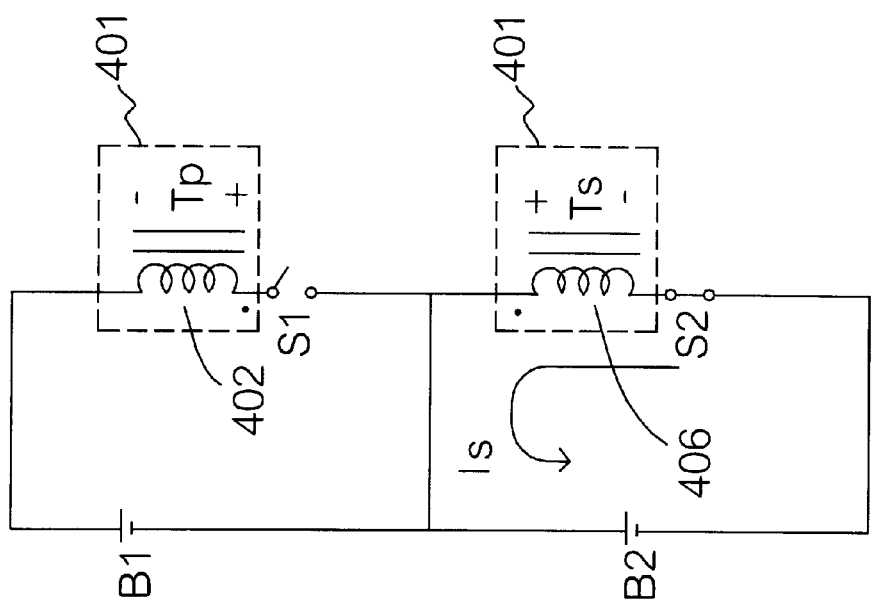

Furthermore, the turns of the primary winding 402 of the transformer 401 and that of the secondary winding 406 of the transformer 401 can be equal. The primary winding 402 has a positive terminal 404 and the secondary winding 406 has a positive terminal 408. The positive terminals 404 and 408 are the terminals, which are marked by dots in the transformer symbol. The transformer operates as follows: the positive terminal 408 of the secondary winding 406 has the same voltage polarity as the positive terminal 404 of the primary winding 402. The positive terminal 404 connects to the positive terminal 408 through switch S1 FIGS. 5A and 5B show the operation of the circuit of the cell voltage balancer as shown in FIG. 4. FIG. 5A is the equivalent circuit diagram of the cell voltage balancer, as shown in FIG. 4, according to a preferred embodiment of the invention while switch S1 is turned on and switch S2 is turned off. FIG. 5B is the equivalent circuit diagram of the cell voltage balancer according to a preferred embodiment of the invention while switch S1 is off and switch S2 is on. The cell voltage of cell B1 is V1, and the voltage of cell B2 is V2. Switch S1 and switch S2 are switched on and off alternatively. While switch S1 is on, cell B1 discharges and generates current Ip. Meanwhile, because switch S2 is off, current will not flow through the secondary winding 406. Current Ip therefore flows through the primary winding 402 so the electrical energy of cell B1 is transformed to magnetic energy and stored in the core of the transformer 401.

Next, switch S1 is turned off and switch S2 is turned on. When the switch S1 is turned off, the magnetic flux in the core of the transformer 401 disappears. According to Faraday's law of induction, an induced electromotive force (emf) is generated due to the change of magnetic flux. Consequently, the induced emf across the primary winding 402 is substantially equal to the voltage of cell B1, V1, with inverse polarity. That is to say, voltage Tp across the primary winding 402 upon switch S2 turning on is substantially equal to voltage V1 with inverse polarity as shown in FIG. 5B. Voltage Ts across the secondary winding 406 changes to V1 with inverse polarity because the turns of the primary winding 402 and the turns of the secondary winding 406 are equal. Because the voltage of V1 across the secondary winding 406 is larger than the voltage of V2 across the cell B2, current Is is therefore generated and flows out from the secondary winding 406. The magnetic energy stored in the transformer 401 is then released in form of current Is, and transformed to cell B2 by current Is flowing back to the cell B2 for charging. Thus, the energy of the cell with higher voltage, cell B1, transfers to the cell with lower voltage, cell B2. The object of balancing the voltage of cell B1 and cell B2 is then achieved by using the cell voltage balancer of a preferred embodiment of the invention.

The principle of operation is similar, while the voltage of cell B2 is higher than the voltage of cell B1. The energy of cell B2 is effectively transferred to cell B1 to balance the voltage of cell B1 and cell B2. The transformer 401 according to a preferred embodiment of the invention can be a flyback transformer. Current flows through the primary winding 402 and the secondary winding 406 of the flyback transformer at different points in time.

Preferably, switch S1 and switch S2 can each be a Metal Oxide Semiconductor Field Effect Transistor (MOSFET). Body diodes of MOSFET can be used as diode D1 and diode D2. Thus, the number of devices in the cell voltage balancer 400 is reduced.

Figure 8A:
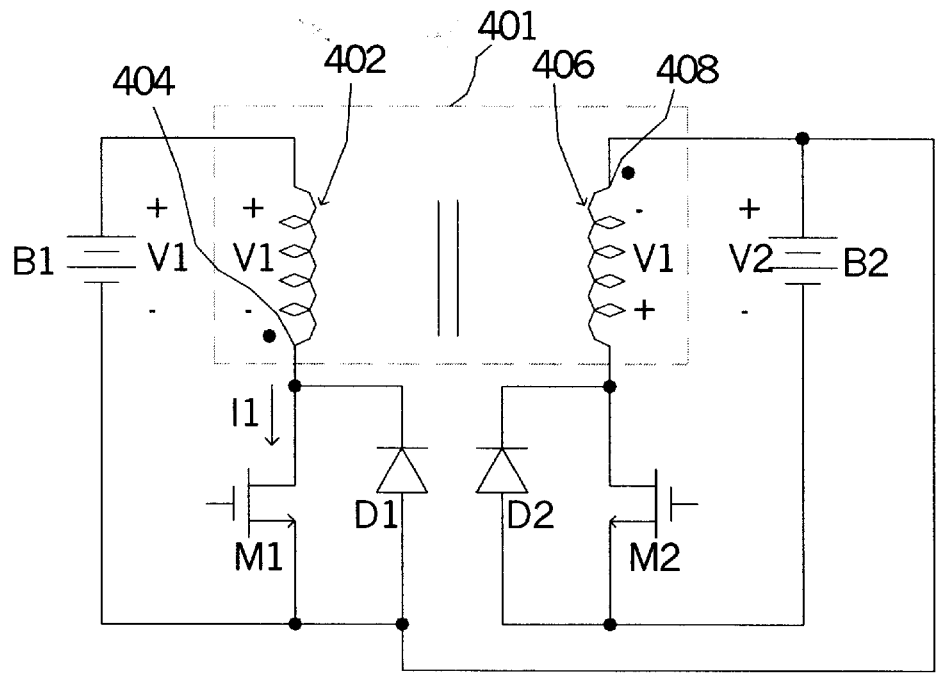
FIG. 8A and B show the cell voltage balancer using MOSFETs as switches.
Figure 8B:
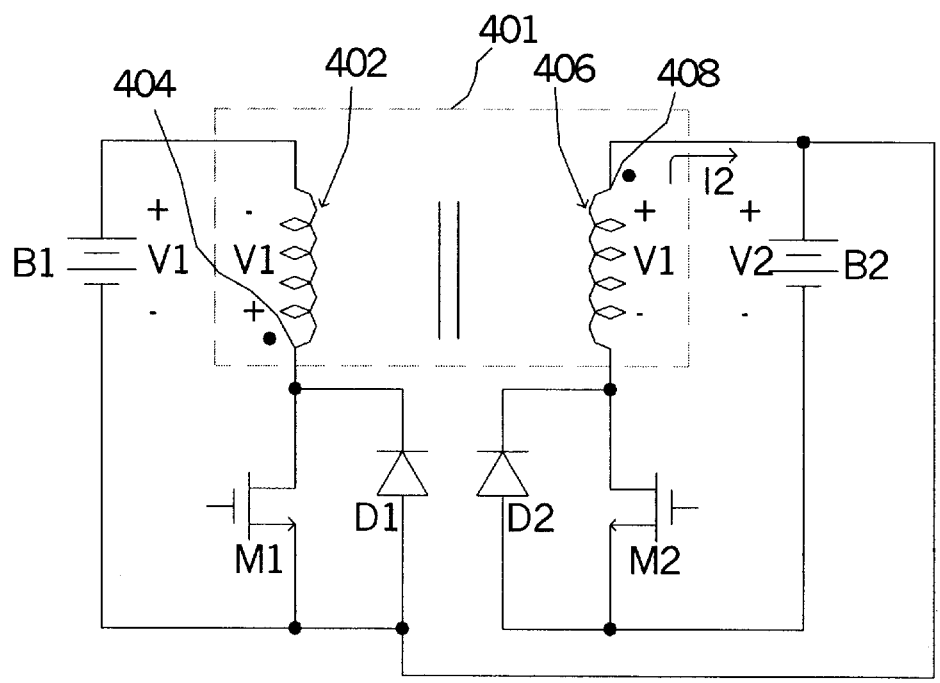

Referring to FIG. 8A and 8B, the cell voltage balancer using MOSFETS as switches is illustrated. For the sake of clarity, the components of the cell voltage balancer are rearranged. FIG. 8A shows the cell voltage balancer with the first MOSFET M1 turned on and the second MOSFET M2 turned off. Meanwhile, FIG. 8B shows the cell voltage balancer with the first MOSFET M1 turned off and the second MOSFET M2 turned on. The detailed operations of the cell voltage balancer shown in FIG. 8A and 8B will be described in the following.

In FIG. 8A, when the MOSFET M1 is turned on, the cell B1, primary winding 402 and MOSFET M1 form a loop and the voltage across the primary winding 402 is about the voltage across cell B1 which is V1. At the same time, although the MOSFET M2 is turned off, the voltage across the secondary winding 406 is also about V1. The positive terminal 404 of primary winding 402 and the positive terminal 408 of secondary winding 406 have the same polarity which is positive polarity, as shown in FIG. 8A.

In FIG. 8B, the MOSFET M1 is turned off and the MOSFET M2 is turned on. When the MOSFET M1 is turned off, the magnetic flux in the core of the transformer 401 disappears. According to Faraday's law of induction, an induced emf is generated due to the change of magnetic flux, which results the voltage of the primary winding 402 to be equal to V1 with inverse polarity as shown in FIG. 8B. The voltage of the secondary winding 406 changes to V1 with inverse polarity, too. The positive terminal 404 of primary winding 402 and the positive terminal 408 of secondary winding 406 have the same polarity, negative polarity, as shown in FIG. 8B. Because the MOSFET M2 is turned on, the secondary winding 406, MOSFET M2, and cell B2 form a loop. Thus, owing to the higher voltage of the secondary winding 406 comparing to cell B2, a current 12 is generated and flows into cell B2 to charge the B2. By turning on the MOSFET M1 and M2 alternatively, the voltage of the primary winding 402 and the secondary winding 404 change alternatively and the energy of cell B1 will transfer to cell B2. Only with simple circuit structure of the cell voltage balancer of the invention, the goal of cell balance is achieved by discharging a higher voltage cell and charging a lower voltage cell through the transformer 401.

Figure 6:
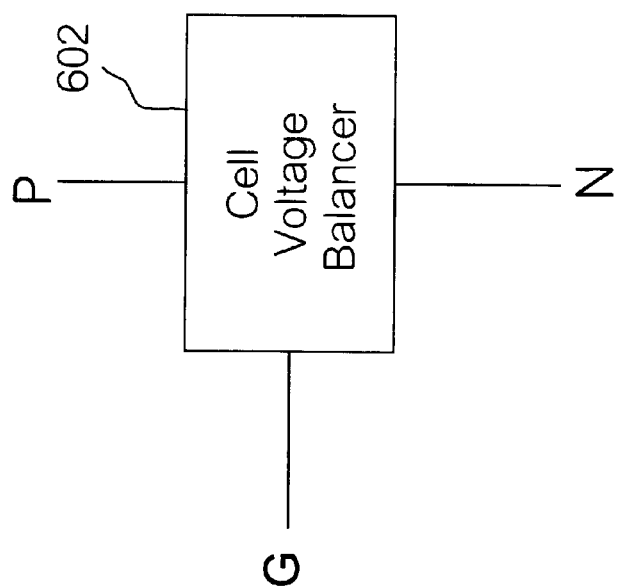
FIG. 6 is the block diagram of the cell voltage balancer according to a preferred embodiment of the invention as shown in FIG. 4.

The cell voltage balancer according to a preferred embodiment of the invention as shown in FIG. 4 is provided in form of a module, which is shown in FIG. 6. The cell voltage balancer 602 includes three input terminals P, G, and N.

Figure 7:
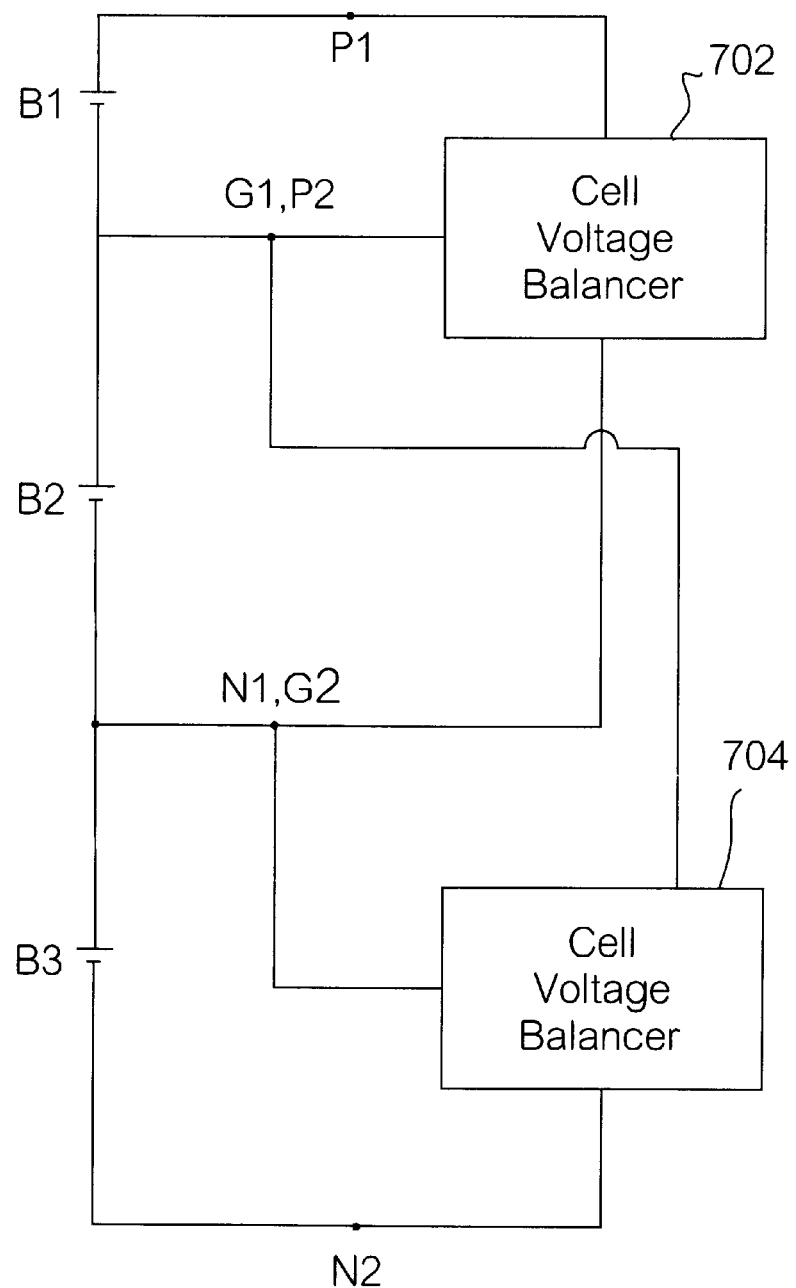
FIG. 7 shows the schematic diagram of applying the cell voltage balancer to more than two cells according to a preferred embodiment of the invention.

FIG. 7 shows the schematic diagram of applying more than two cells in the cell voltage balancer according to a preferred embodiment of the invention. Cell B1 and cell B2 are connected to the cell voltage balancer 702 and cell B2 and cell B3 are connected to the cell voltage balancer 704. Two terminals of cell B1 are connected to the input terminals P1 and G1 of the cell voltage balancer 702; two terminals of the cell B2 are connected to the input terminals G1 and N1 of the cell voltage balancer 702 and the input terminals P2 and G2 of the cell voltage balancer 704; two terminals of cell B3 are connected to the input terminals G2 and N2 of the cell voltage balancer 704.

As shown in FIG. 7, the cell voltage balancer 702 is used to balance the cell voltage of cell B1 and cell B2 in order to make the voltage of cell B1 and the voltage of cell B2 equivalent. The cell voltage balancer 704 is used to balance the cell voltage of cell B2 and cell B3 in order to make the voltage of cell B2 and the voltage of cell B3 equivalent. Consequently, the voltage of cell B1, the voltage of cell B2 and the voltage of cell B3 are balanced to be substantially equal. While the serially connected cell is more than 3, each of the cell voltage balancers is connected to two adjacent cells, so that the cell voltage can be balanced.

The cell voltage balancer according to a preferred embodiment of the invention can be used to balance more than two serially connected cells during charging. Thus, the voltage of the cells are balanced to be substantially equal. Overcharge of the cell with higher voltage is prevented. The transformer according to a preferred embodiment of the invention has a primary winding and a secondary winding with equal turns, which makes the design of the cell voltage balancer easier without being effected by the number of serially connected cells.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A cell voltage balancer for balancing the voltage of a first cell and the voltage of a second cell, wherein the cell voltage balancer comprises a first input terminal, a second input terminal and a third input terminal and the voltage of the first cell is higher than the voltage of the second cell, wherein the cell voltage balancer comprises:

a transformer, comprising a primary winding and a secondary winding;

a first switch and a second switch, wherein the first switch and the primary winding are serially connected between the first input terminal and the second input terminal and the second switch and the secondary winding are serially connected between the second input terminal and the third input terminal and wherein the first switch and the second switch are turned on and off alternatively; and a first diode and a second diode, wherein the first diode and the first switch are connected in parallel and the second diode and the second switch are connected in parallel;

wherein, while the first switch is turned on and the second switch is turned off, the primary winding stores energy from the first cell in the transformer and while the first switch is turned off and the second switch is turned on, the secondary winding recovers energy stored in the transformer and transfers it into the second cell.

2. The cell voltage balancer as claimed in claim 1, wherein each of the first switch and the second switch is a transistor.

3. The cell voltage balancer as claimed in claim 1, wherein each of the first switch and the second switch is a Metal Oxide Semiconductor Field Effect Transistor (MOSFET).

4. The cell voltage balancer as claimed in claim 1, wherein the primary winding and the secondary winding have equal turns.

5. The cell voltage balancer as claimed in claim 1, wherein the primary winding comprises a first terminal and the secondary winding comprises a second terminal, and a second current flows from the second terminal of the secondary winding while a first current flows from the first terminal of the first primary winding, and wherein the second input terminal is connected to the first terminal and the second terminal.

6. The cell voltage balancer as claimed in claim 1, wherein the first input terminal is connected to the positive terminal of the first cell, the second input terminal is connected to the negative terminal of the first cell and the positive terminal of the second cell and the third input terminal is connected to the negative terminal of the second cell.

7. A cell voltage balancer for balancing the voltage of a first cell and the voltage of a second cell, wherein the cell voltage balancer comprises a first input terminal, a second input terminal and a third input terminal and the voltage of the first cell is higher than the voltage of the second cell, wherein the cell voltage balancer comprises:

a transformer, comprising a primary winding and a secondary winding; and a first switch and a second switch, wherein the first switch and the primary winding are serially connected between the first input terminal and the second input terminal and the second switch and the secondary winding are serially connected between the second input terminal and the third input terminal and wherein the first switch and the second switch are turned on and off alternatively;

wherein, while the first switch is turned on and the second switch is turned off, the primary winding stores energy from the first cell in the transformer and while the first switch is turned off and the second switch is turned on, the secondary winding recovers energy stored in the transformer and transfers it into the second cell.

8. The cell voltage balancer as claimed in claim 7, wherein the cell voltage balancer further comprises a first diode and a second diode, wherein the first diode and the first switch are connected in parallel and the second diode and the second switch are connected in parallel.

9. The cell voltage balancer as claimed in claim 7, wherein each of the first switch and the second switch is a Metal Oxide Semiconductor Field Effect Transistor (MOSFET).

10. The cell voltage balancer as claimed in claim 8, wherein each of the first switch and the second switch is a MOSFET.

11. The cell voltage balancer as claimed in claim 7, wherein the primary winding and the secondary winding have equal turns.

12. The cell voltage balancer as claimed in claim 7, wherein the primary winding comprises a first terminal and the secondary winding comprises a second terminal, and a second current flows from the second terminal of the secondary winding while a first current flows from the first terminal of the first primary winding, and wherein the second input terminal is connected to the first terminal and the second terminal.

13. The cell voltage balancer as claimed in claim 7, wherein the first input terminal is connected to the positive terminal of the first cell, the second input terminal is connected to the negative terminal of the first cell and the positive terminal of the second cell and the third input terminal is connected to the negative terminal of the second cell.

14. A cell voltage balancing system for balancing the voltage of a plurality of cells, comprising:

a plurality of cell voltage balancers, wherein each of the cell voltage balancers comprises a first input terminal, a second input terminal and a third input terminal, each of the cell voltage balancers is connected to two adjacent cells, a first cell and a second cell, of the cells and the second input terminal is connected to a node of the first cell and the second cell, wherein each of the cell voltage balancers comprises:

a transformer, comprising a primary winding and a secondary winding;

a first switch and a second switch, wherein the first switch and the primary winding are serially connected between the first input terminal and the second input terminal and the second switch and the secondary winding are serially connected between the second input terminal and the third input terminal and wherein the first switch and the second switch are turned on and off alternatively; and a first diode and a second diode, wherein the first diode and the first switch are connected in parallel and the second diode and the second switch are connected in parallel;

wherein, while the first switch is turned on and the second switch is turned off, the primary winding stores energy from the first cell in the transformer and while the first switch is turned off and the second switch is turned on, the secondary winding recovers energy stored in the transformer and transfers it into the second cell.

15. The cell voltage balancing system as claimed in claim 14, wherein with respect to each of the cell voltage balancers, each of the first switch and the second switch is a transistor.

16. The cell voltage balancing system as claimed in claim 14, wherein with respect to each of the cell voltage balancers, each of the first switch and the second switch is a MOSFET.

17. The cell voltage balancing system as claimed in claim 15, wherein with respect to each of the cell voltage balancers, each of the first switch and the second switch is a MOSFET.

18. The cell voltage balancing system as claimed in claim 14, wherein with respect to each of the cell voltage balancers, the primary winding and the secondary winding have equal turns.

19. The cell voltage balancing system as claimed in claim 14, wherein with respect to each of the cell voltage balancers, the primary winding comprises a first terminal and the secondary winding comprises a second terminal, and a second current flows from the second terminal of the secondary winding while a first current flows from the first terminal of the first primary winding, and wherein the second input terminal is connected to the first terminal and the second terminal.

20. The cell voltage balancing system as claimed in claim 14, wherein with respect to each of the cell balancers, the first input terminal is connected to the positive terminal of the first cell, the second input terminal is connected to the negative terminal of the first cell and the positive terminal of the second cell and the third input terminal is connected to the negative terminal of the second cell.

21. A cell voltage balancing system for balancing the voltage of a plurality of cells, comprising:
a plurality of cell voltage balancers, wherein each of the cell voltage balancers comprises a first input terminal, a second input terminal and a third input terminal, each of the cell voltage balancers is connected to two adjacent cells, a first cell and a second cell, of the cells and the second input terminal is connected to a node of the first cell and the second cell, wherein each of the cell voltage balancers comprises:
a transformer, comprising a primary winding and a secondary winding;
a first switch and a second switch, wherein the first switch and the primary winding are serially connected between the first input terminal and the second input terminal and the second switch and the secondary winding are serially connected between the second input terminal and the third input terminal and wherein the first switch and the second switch are switched on and off alternatively; and
wherein, while the first switch is turned on and the second switch is turned off, the primary winding stores energy from the first cell in the transformer and while the first switch is turned off and the second switch is turned on, the secondary winding recovers energy stored in the transformer and transfers it into the second cell.

22. The cell voltage balancing system as claimed in claim 21, further comprising with respect to each of the cell voltage balancers, a first diode and a second diode, wherein the first diode and the first switch are connected in parallel and the second diode and the second switch are connected in parallel.

23. The cell voltage balancing system as claimed in claim 21, wherein with respect to each of the cell voltage balancers, each of the first switch and the second switch is a MOSFET.

24. The cell voltage balancing system as claimed in claim 21, wherein with respect to each of the cell voltage balancers, the primary winding and the secondary winding have equal turns.

25. The cell voltage balancing system as claimed in claim 21, wherein with respect to each of the cell voltage balancers, the primary winding comprises a first terminal and the secondary winding comprises a second terminal, and a second current flows from the second terminal of the secondary winding while a first current flows from the first terminal of the first primary winding, and wherein the second input terminal is connected to the first terminal and the second terminal.

26. The cell voltage balancing system as claimed in claim 21, wherein with respect to each of the cell voltage balancers, the first input terminal is connected to the positive terminal of the first cell, the second input terminal is connected to the negative terminal of the first cell and the positive terminal of the second cell and the third input terminal is connected to the negative terminal of the second cell.

27. A cell voltage balancer for balancing the voltage of a first cell and the voltage of a second cell, wherein the cell voltage balancer comprises a first input terminal, a second input terminal and a third input terminal and the voltage of the first cell is higher than the voltage of the second cell, wherein the cell voltage balancer comprises:
a transformer, comprising a primary winding and a secondary winding; and
a first switch and a second switch, wherein the first switch and the primary winding are serially connected between the first input terminal and the second input terminal and the second switch and the secondary winding are serially connected between the second input terminal and the third input terminal and wherein the first switch and the second switch are turned on and off alternatively; and
wherein, while the first switch is turned on and the second switch is turned off, the primary winding stores energy from the first cell in the transformer and while the first switch is turned off and the second switch is turned on, the secondary winding recovers energy stored in the transformer and transfers it into the second cell; and
wherein the first switch and the second switch are both MOSFETs.

28. The cell voltage balancer as claimed in claim 1, wherein the primary winding includes a primary terminal having a first voltage polarity and the secondary winding includes a secondary terminal having a same voltage polarity as the first voltage polarity, and wherein the second input terminal is connected to the primary terminal and the secondary terminal.

29. The cell voltage balancer as claimed in claim 7, wherein the primary winding includes a primary terminal having a first voltage polarity and the secondary winding includes a secondary terminal having a same voltage polarity as the first voltage polarity, and wherein the second input terminal is connected to the primary terminal and the secondary terminal.

30. The cell voltage balancing system as claimed in claim 14, wherein with respect to each of the cell voltage balancers, the primary winding includes a primary terminal having a first voltage polarity and the secondary winding includes a secondary terminal having a same voltage polarity as the first voltage polarity, and wherein the second input terminal is connected to the primary terminal and the secondary terminal.

31. The cell voltage balancing system as claimed in claim 21, wherein with respect to each of the cell voltage balancers, the primary winding includes a primary terminal having a first voltage polarity and the secondary winding includes a secondary terminal having a same voltage polarity as the first voltage polarity, and wherein the second input terminal is connected to the primary terminal and the secondary terminal.

* * * * *